Oct. 31, 1961  J. K. RUSSELL  3,006,480
GATHERED SOCK OIL FILTER
Filed Sept. 19, 1958  2 Sheets-Sheet 1
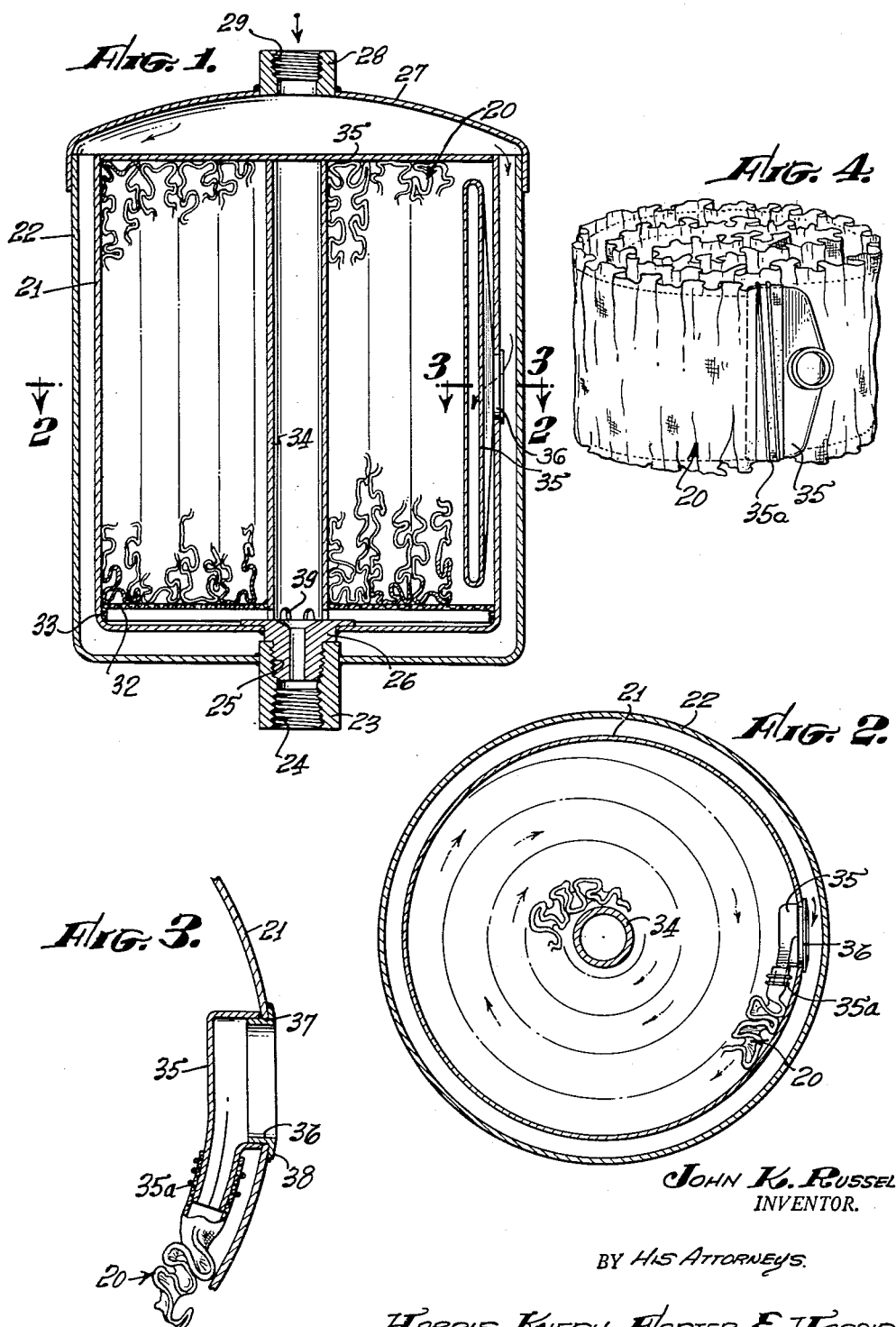
John K. Russell,
INVENTOR.
BY HIS ATTORNEYS.
Harris, Kiech, Foster & Harris.

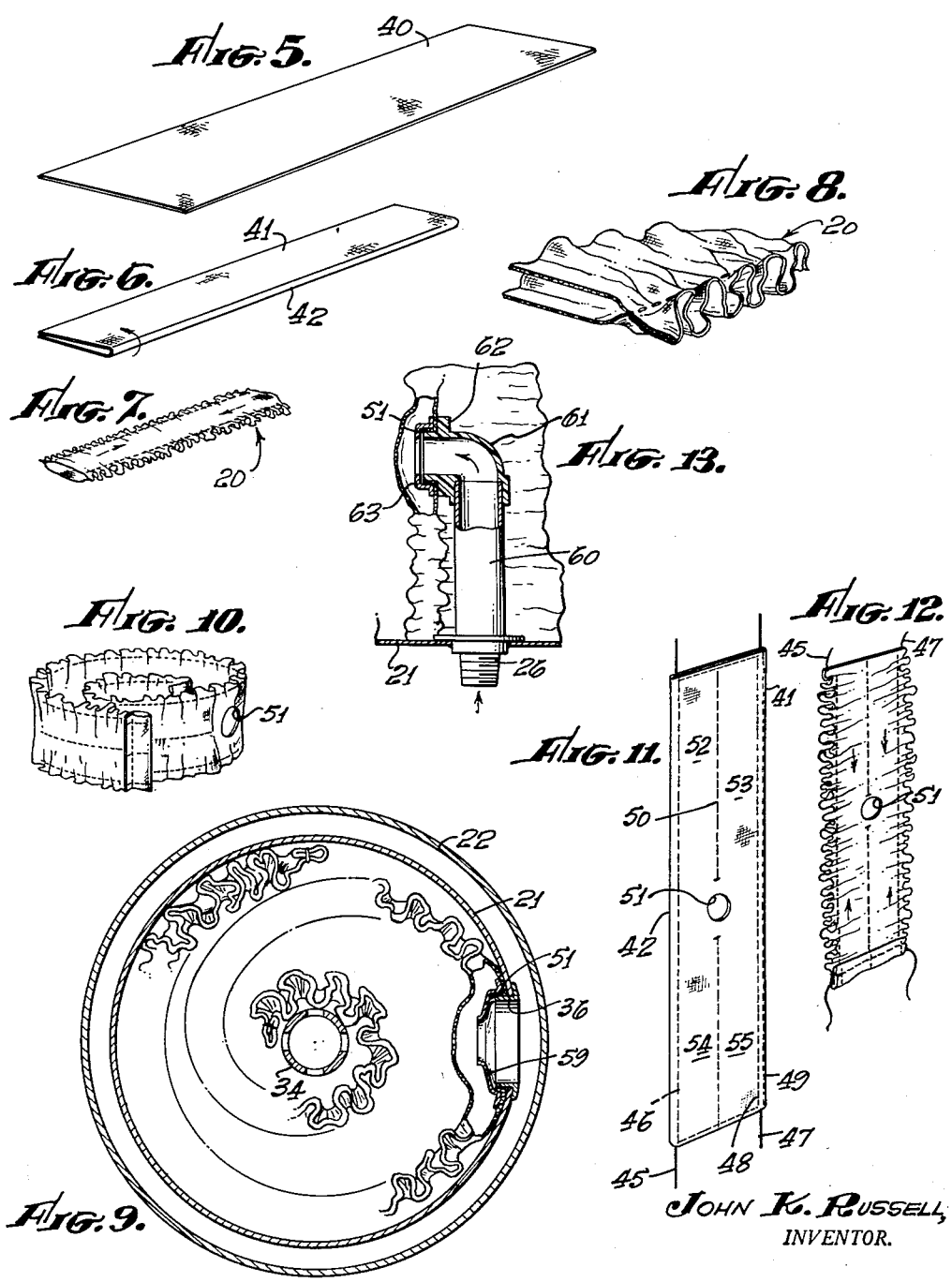

United States Patent Office 3,006,480
Patented Oct. 31, 1961

3,006,480
GATHERED SOCK OIL FILTER
John K. Russell, Los Angeles, Calif., assignor to Luber-Finer Incorporated, Los Angeles, Calif., a corporation of California
Filed Sept. 19, 1958, Ser. No. 761,980
12 Claims. (Cl. 210—493)

This invention relates to oil filters and, in particular, to filters capable of handling high rates of flow such as are required in filters handling the full flow of lubricating oil in an engine.

The invention contemplates the use of a fabric bag or sock with the incoming oil being directed into the interior of the sock and flowing outward through the fabric with the impurities being retained within the sock. In the previously known sock type filters, it has been necessary to provide additional elements for supporting and/or spacing the sock within the filter unit. It is an object of the present invention to provide a sock type oil filter which does not require additional supporting or spacing elements. A further object is to provide a sock type filter suitable for use as a full flow filter having a large filtering area which operates at low differential pressures with low fluid holdup.

It is an object of the invention to provide a sock type filter which is gathered or wrinkled to provide pleats or corrugations along the surface thereof, which pleats or corrugations provide for spacing of adjacent portions of the sock and create a large amount of filtering area in a short length of sock. A further object is to provide such a gathered sock filter in which the gathering may be achieved by gather stitching along the sock. Another object is to provide such a unit which may be gathered by means of drawstrings positioned within drawstring tubes in the sock.

It is an object of the invention to provide a gathered sock filter suitable for mounting in a container of conventional shape and in which the incoming fluid may be directed into an opening at an end of the sock or an opening intermediate the ends thereof. Another object is to provide such a filter which may have more than one inlet opening for the incoming fluid, such as in large capacity units. A further object is to provide such a filter in which a plurality of parallel flow paths may be provided within the gathered sock, thereby increasing the flow rate and reducing the holdup.

The invention also comprises novel details of construction and novel combinations and arrangements of parts, together with other objects, advantages, features and results which will more fully appear in the course of the following description. The drawings merely show and the description merely describes preferred embodiments of the present invention which are given by way of illustration or example.

In the drawings:

FIG. 1 is a sectional view of a filter unit having a gathered sock filter therein;

FIG. 2 is a sectional view taken along the line 2—2 of FIG. 1;

FIG. 3 is an enlarged, sectional view taken along the line 3—3 of FIG. 1;

FIG. 4 is a perspective view of the gathered sock filter of FIG. 1;

FIGS. 5, 6, and 7 illustrate steps in the manufacture of the filter of FIG. 4;

FIG. 8 is an enlarged view of a portion of the unit of FIG. 7;

FIG. 9 is a sectional view similar to that of FIG. 2 showing an alternative form for the gathered sock filter;

FIG. 10 is an isomeric view of the filter of FIG. 9;

FIGS. 11 and 12 show steps in the manufacture of the filter of FIG. 10; and

FIG. 13 is a sectional view similar to that of FIG. 1 showing another alternative form of the invention.

In the filter unit of FIG. 1, a gathered sock filter 20 is mounted in a container 21 which in turn is mounted in a case 22. An outlet plug 23 is fixed in the bottom of the case 22 and has a threaded opening 24 for connection with an oil lin (not shown) and a threaded opening 25 for receiving a plug 26. A cover 27 for the case 22 has an inlet plug 28 fixed therein, the plug having a threaded opening 29 for receiving an oil line (not shown).

The plug 26 is fixed in the bottom of the container 21. A screen 32 having a down turned flange 33 is positioned within the container, as is a tubular core 34. The filter 20 is wound around the core 34 and is retained within the container by a top 35. The filter may be wound directly on the core and the core and filter inserted into the container as a unit. Alternatively, the filter may be coiled and set in place in the container around a previously inserted core. The filter 20 is made in the form of a tube or sock with one end closed and a nozzle 35 positioned in the other end and held in place by a wire 35a or the like. A short nipple 36 is positioned in an opening 37 in the container 21, the nipple having a flange 38 by which it is fixed to the wall of the container 21. The nozzle 35 is fitted over the nipple on the interior of the container, as best seen in FIG. 3. Oil flows into the unit through the inlet plug 28, down through the space between the container 21 and case 22, through the nipple 36 and nozzle 35 into the filter 20. The oil flows out through the fabric of the filter and down between the turns of the filter, through the screen 32 and opening 39 in the core 34, and out through the plugs 26 and 23. Where desired, another screen can be placed at the upper end of the container 21 permitting flow both upward and downward from the filter. Also, the core 34 may be perforated as shown in FIG. 9, permitting radial flow of oil into the core.

The filter 20 is formed of a relatively long tube or sock of suitable fabric which has been gathered along its entire length to provide the large number of closely spaced irregular corrugations as shown in the drawings. One method of manufacturing the filter is shown in FIGS. 5 through 8. A piece of material 40 which, for example, may be eight inches wide by sixty inches long is folded along its longitudinal center line as shown in FIG. 6. The folded piece is then gather stitched along both longitudinal edges 41 and 42 to form the gathered sock of FIG. 7. The gather stitching may be done on a sewing machine and it is preferred to have the gathering reduce the over-all length of the piece by at least two to one. An enlarged view of the portion of the gathered sock of FIG. 7 is shown in FIG. 8, showing the continuous and closely spaced irregular corrugations in detail. Returning to our example, the folded piece of fabric which was four inches by sixty inches would, after gather stitching, be in the order of four inches by thirty inches but would have a thickness in the order of one inch. These pleats or corrugations extend transversely of the tube, beginning at each edge along the entire length thereof. A particular corrugation originating at one gathered edge does not necessarily have a counterpart at the opposite gathered edge, that is, the gathered tube does not resemble a strip of corrugated paper, but the corrugations have an irregular appearance, as shown in FIGS. 4, 8, 10 and 12. Thus, the corrugations have varying lengths. Some may extend only part way across the width of the tube, while others may extend entirely across. Such irregular arrangement discourages compaction of the filter element, while providing an exceptionally large filtering area operating at a relatively low pressure differential.

When being used in the filter of FIG. 1, the gathered sock of FIG. 7 would have one end closed by sewing or the like and the nozzle 35 fitted in the other end. Then the sock would be wound around the core 34 and placed in the container 21.

This gathered sock filter will maintain itself upright in the container without requiring additional stiffeners. Also, the numerous irregular corrugations will provide oil flow spaces both within the sock and between the turns of the sock so that the incoming oil can flow through the sock and so that the filtered oil will have an easy exit. Because of the longitudinal shrinkage produced by the gathering, the resulting filter will have a relatively high volume, short flow path as compared with a conventional long, ungathered sock. This results in a higher rate of flow with lower pressure drop. This lowering of the pressure across the bag substantially eliminates the problems of splitting of the bag normally encountered. Another advantage of the gathered construction is the fact that the filter can be coiled for insertion into a container with a central core already therein, since the gathered sock filter is sufficiently rigid to be self supporting without requiring additional vertical supports.

FIGS. 9 through 12 show several alternative embodiments including an alternative method of making the gathered sock filter, an alternative arrangement of oil flow paths within the sock, and an alternative method of mounting the filter in the container.

A sheet of filter fabric 40 is folded along its longitudinal axis as shown in FIG. 6. A length of cord 45 is positioned between the folded pieces at the edge 42 and a seam 46 is sewn along the edge, providing a pocket or tube between the edge and the seam for the cord 45. A similar cord 47 is positioned at the edge 41 and seams 48 and 49 are sewn along each side of the cord 47 to form a tube therefor. Each end of the sock is closed by suitable stitching. A longitudinal seam 50 is sewn down the center of the sock, being interrupted where an opening 51 is formed in one wall of the sock, forming four flow channels 52, 53, 54, 55 within the sock.

The cords 45 and 47, which function as drawstrings, are fixed at one end of the sock by suitable means, such as by folding over and stitching down the end as shown at the bottom of FIG. 12. Then the sock is decreased in length by sliding along the drawstrings to provide the gathered sock with many closely spaced convolutions as shown in FIG. 12. The drawstring cords are then tied or otherwise fixed to maintain the sock in its gathered condition. As in the sock of FIG. 4, the preferred reduction in length is in the order of 2:1.

The gathered sock of FIG. 12 is coiled as seen in FIG. 10 and placed in the container 21 as shown in FIG. 9. The sock is positioned with the opening 51 around the nipple 36 and another flanged nipple or bushing 59 disposed within the sock is pressed over the sock and nipple 36 to clamp the sock in position.

The sock of FIGS. 9 through 12 provides a plurality of relatively short flow paths, permitting a high rate of flow and this embodiment is preferred for use in full flow type filter units.

Of course, the number of parallel paths within the sock can be changed as desired. Furthermore, it should be noted that the drawstring type of gathering can also be used with the filter of FIG. 4, and, conversely, the stitching type of gathering can also be used with the filter of FIG. 10. Also, more than one inlet opening can be provided when desired and the inlet opening or openings may be positioned at the end or ends of the sock, at the middle or at other intermediate points.

An alternative form of construction using the gathered sock filter for flow from the center of the filter unit outward is shown in FIG. 13. A short core or center tube 60 is mounted in the container 21 on the plug 26 providing for fluid flow in through the plug 26 and up through the core 60. A right angle elbow 61 is mounted on top of the core 60, the elbow being provided with a flange 62 adjacent its open end. A suitable gathered sock filter, such as the filter of FIG. 10, is positioned around the core 60 within the container 21 with the opening 51 of the filter over the open end of the elbow, the filter being clamped in position against the flange 62 by a bushing 63 which is a press fit over the elbow. The cylindrical wall of the container 21 is perforated so that fluid may flow into the core 60 and into the interior of the sock, then through the fabric comprising the sock and outward through the openings of the container.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. A filter element for use in an oil filter or the like, comprising a plurality of flat, elongated tubes of flexible filter material joined along opposed longitudinal edges to form a single filter element, said filter element having interior passages for fluid communication between said tubes, said filter element having an inlet opening providing for fluid flow into the interior thereof, said filter element being gathered longitudinally inwardly of at least some of said edges to decrease the length of the filter element and provide sides having irregularly corrugated surfaces extending inwardly varying distances from each edge toward the opposite edge and transversely of the length thereof.

2. In a gathered sock filter, the combination of: a container having an inlet opening in an outer surface thereof; a filter core; an elongated tubular sock of filter material having opposed longitudinal, closed edges and an inlet opening for fluid flow into the interior of the sock, said sock being gathered longitudinally inwardly from said edges providing sides having irregularly corrugated surfaces extending inwardly varying distances from each edge toward the opposite edge and transversely of the length thereof, said sock being disposed about said core to form a wound unit, with said sock inlet opening at the outer surface of said wound unit, said wound unit being positioned within said container; and means for coupling said container and sock inlet openings together for fluid flow from the exterior of said container to the interior of said sock.

3. In a gathered sock oil filter, the combination of: a cylindrical container having an inlet opening in the wall thereof; a tubular core; a length of filter material formed into an elongated tubular sock with an inlet opening for flow of fluid into the interior thereof, said sock being disposed about said core with said inlet opening at the outer surface and with said sock gathered in the direction of winding for decreasing the length and providing sides having irregular corrugated surfaces, the corrugations extending varying distances transversely of the direction of winding, said sock and core being mounted within said container; and means for coupling said container and sock inlet opening together for fluid flow from the exterior of said container to the interior of said sock.

4. A filter as defined in claim 3 in which said sock has a plurality of rows of gather stitching in said direction of winding.

5. A filter as defined in claim 3 in which said sock has a plurality of drawstring pockets extending in the direction of winding with drawstrings positioned in said pockets and drawn to gather the sock.

6. In a gathered sock filter, the combination of: a container having at least one outlet opening in the outer surface thereof; a filter core having an inlet passage therethrough; an elongated tubular sock of filter material having opposed longitudinal edges and an inlet opening for fluid flow to the interior of the sock, said sock being gathered longitudinally inwardly from said edges providing sides having irregularly corrugated surfaces extending inwardly varying distances from each edge toward the opposite edge and transversely of the length thereof, said sock being disposed about said core to form a wound unit, with said sock inlet opening at the inner surface of said wound unit, said wound unit being positioned within said container; and means for coupling said core inlet passage and said sock inlet opening together for fluid flow from the exterior of said container to the interior of said sock.

7. A filter element for use in an oil filter or the like, comprising: a flat, elongated tube formed of a flexible filter material, said tube having opposed, longitudinally extending closed edges and an inlet opening for fluid flow into the interior thereof, said tube being gathered longitudinally to decrease the length of the tube and to provide sides having irregular corrugated surfaces, the corrugations extending varying distances transversely of the tube.

8. A filter element as defined in claim 7, in which the tube is gathered inwardly from each edge.

9. A filter element as defined in claim 7, in which the filter material is gather-stitched along the edges thereof.

10. A filter element as defined in claim 7, in which the filter material includes a smaller tube along each of said edges, and drawstrings positioned in each of said smaller tubes longitudinally gathering said flat tube to decrease the length of the tube to provide the corrugated surfaces.

11. A filter element as defined in claim 7, in which said tube includes a centrally located longitudinal seam providing two longitudinal pockets within said tube, said tube having an inlet opening intermediate the ends thereof providing communication between each of said pockets and the exterior for fluid flow into said pockets.

12. The combination defined in claim 2, in which said container inlet opening includes an inwardly opening flange extending into the inlet opening of said sock, and a bushing positioned around said flange for clamping said sock to said flange.

References Cited in the file of this patent

UNITED STATES PATENTS

| | | |
|---|---|---|
| 689,307 | Hermes | Dec. 17, 1901 |
| 1,119,942 | Fauntleroy | Dec. 8, 1914 |
| 1,720,384 | Smith | July 9, 1929 |
| 1,951,484 | Lawes | Mar. 20, 1934 |
| 2,185,281 | Tear | Jan. 2, 1940 |
| 2,540,273 | Manwaring | Feb. 6, 1951 |
| 2,569,745 | Cook | Oct. 2, 1951 |
| 2,650,709 | Rosenak | Sept. 1, 1953 |
| 2,792,943 | Mackintosh | May 21, 1957 |